United States Patent [19]
Cailey

[11] Patent Number: 5,533,487
[45] Date of Patent: Jul. 9, 1996

[54] DYNAMIC ENHANCEMENT OF EGR FLOW IN AN INTERNAL COMBUSTION ENGINE

[75] Inventor: Fred L. Cailey, Batavia, Ill.

[73] Assignee: Navistar International Transportation Corp., Chicago, Ill.

[21] Appl. No.: 264,657

[22] Filed: Jun. 23, 1994

[51] Int. Cl.$^6$ ............................ F02M 25/07; F02G 3/00
[52] U.S. Cl. .......................................... 123/568; 60/605.2
[58] Field of Search ................................. 123/568, 569, 123/570, 571; 60/605.2

[56] References Cited

U.S. PATENT DOCUMENTS

| | | | |
|---|---|---|---|
| 1,476,942 | 12/1923 | Youngblood | 123/568 |
| 1,528,881 | 3/1925 | Jefferis | 123/568 |
| 2,084,142 | 6/1937 | Horton | 123/568 |
| 3,802,402 | 4/1974 | Swatman | 123/568 |
| 3,937,194 | 2/1976 | Tamaki et al. | 123/568 |
| 4,031,867 | 6/1977 | Yasuda et al. | 123/568 |
| 4,327,698 | 5/1982 | Hamai et al. | 123/568 |

OTHER PUBLICATIONS

"History of the Internal Combustion Engine" American Society of Mechanical Engineers, pp. 53–55, Oct. 15–18, 1989.

"Camaro, Malibu, Monte Carlo, Nova Service Manual" No. ST–329–79, General Motors Corp., Jan. 1979, pp. 6E–6, 6E–9.

"Intake Aerodynamics" Seddon and Goldsmith pp. 32–37, Jan. 1985.

Primary Examiner—Willis R. Wolfe
Attorney, Agent, or Firm—Dennis K. Sullivan

[57] ABSTRACT

An exhaust gas recirculation system for a turbocharged internal combustion engine utilizes dynamic forces to enhance exhaust gas flow through the EGR system. An impact tube is disposed facing upstream in the exhaust tract of the engine to increase the static pressure by the dynamic pressure of the flow. The EGR outlet to the engine air intake tract is disposed about an intake air tube to create an annular exhaust passage thereabout which opens into a radially outwardly stepped wall of the intake tract thereby creating a low pressure region at the exit from the EGR system. Still further, the intake tract housing is provided with an arcuate radially diverging wall surface so that the exhaust gas follows the wall in accordance with the Coanda principle and induces increased flow through the intake tract from the turbocharger.

9 Claims, 2 Drawing Sheets

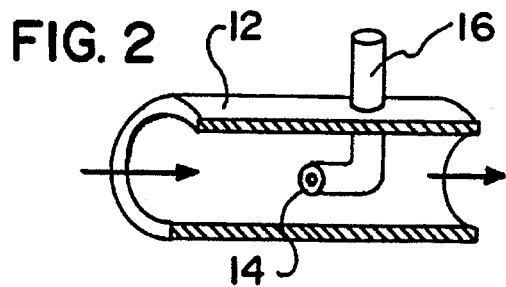
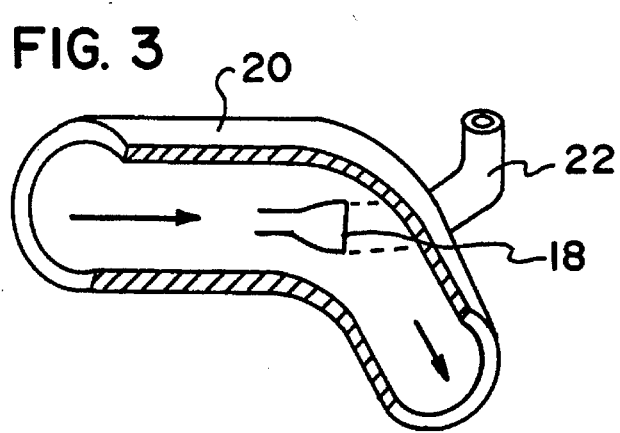
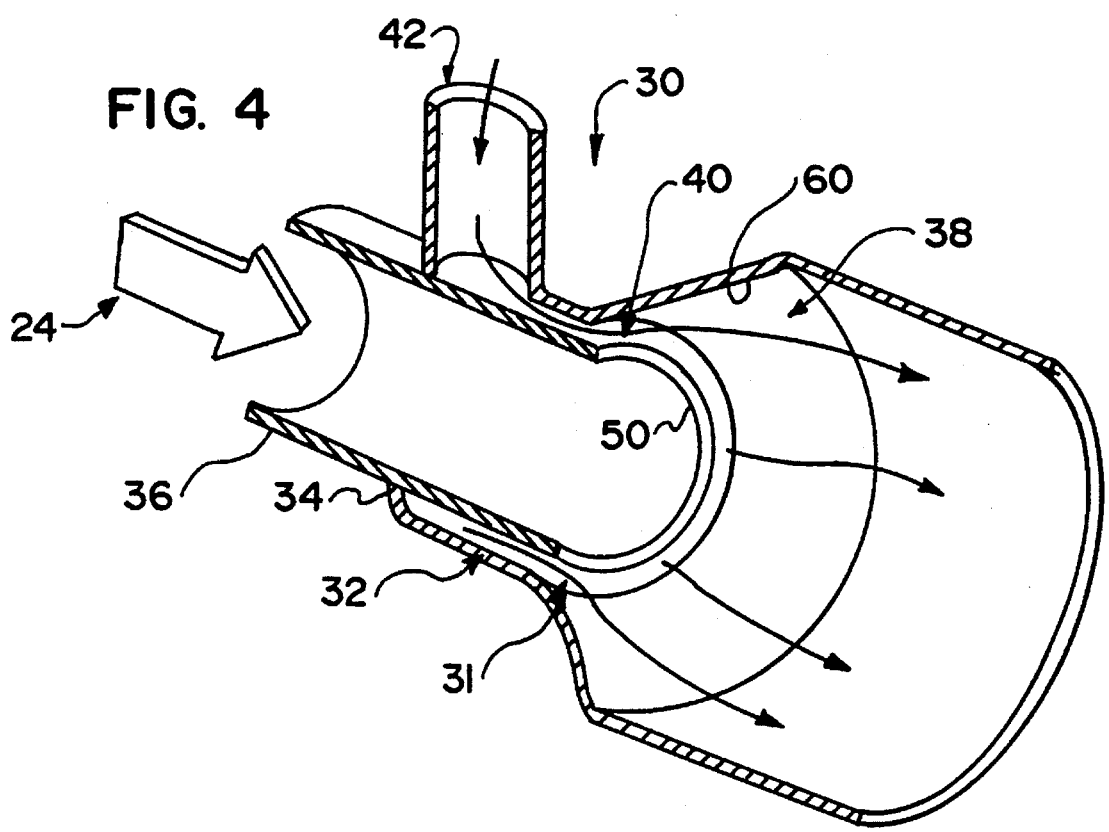

DYNAMIC ENHANCEMENT OF EGR FLOW IN AN INTERNAL COMBUSTION ENGINE

BACKGROUND OF THE INVENTION

The present invention relates to exhaust gas recirculation (EGR) systems for internal combustion engines, particularly turbocharged engines, and, more particularly, to the dynamic enhancement of flow through the EGR system through the provision of devices providing impact pressure in the engine exhaust tract, an intake ejector structure in the EGR discharge to the engine air intake to lower pressure therein, and a Coanda-effect section to recover some of the exhaust energy lost for turbocharging due to diversion to the exhaust gas recirculation system, with the improvements being independent and additive in nature.

THE PRIOR ART

All EGR systems rely on a favorable static pressure differential between the EGR inlet ports in the engine exhaust tract and the EGR discharge ports in the engine air intake tract for movement of the exhaust gases into the engine air intake tract.

On a turbocharged engine, the EGR inlet port is usually located on the upstream side of the turbine and EGR discharge port is on the downstream side of the compressor. When the EGR system is active, some exhaust energy that would normally be used to drive the turbine is lost and, on engines with a good turbocharger match, at certain speeds and loads, the static pressure differential between the turbocharger boost pressure and the exhaust back pressure can be extremely low or even the opposite of what is required for EGR flow.

As will be described in greater detail hereinafter the present system utilizes dynamic forces to produce EGR flow rather than relying solely on the static pressure differential.

SUMMARY OF THE INVENTION

Accordingly, it is a broad object of the invention to provide an EGR system for an internal combustion engine which utilizes dynamic forces to enhance the exhaust gas flow through the system.

It is a further object of the invention to use the dynamic pressures in the engine exhaust tract to enhance the gas flow through the system.

It is a further object of the invention to create a low pressure area on the discharge side of the EGR system at the outlet to the intake tract to enhance the gas flow through the EGR system.

It is a further object of the invention to increase the intake air flow from the turbocharger compressor in the intake tract by utilizing a Coanda effect created by the exhaust gas flow to induce a lower pressure in the intake flow.

It is yet a further object of the invention to provide a system wherein the above-described effects are additive in nature.

These and other objects of the invention are specifically met by an internal combustion engine having an EGR system wherein the dynamic pressure of the exhaust tract flow is added to the static pressure through the use of an impact tube, or alternatively, a NACA duct located in the exhaust tract wall, both being located in a region of high dynamic pressure. On the EGR discharge end, an annular EGR discharge ring disposed about the intake pipe upstream of its outlet provides a low pressure section to enhance the flow through the EGR system. Finally, an arcuately diverging section in the exhaust inlet portion to the engine air intake tract applies the Coanda principle to use the EGR gas flow to induce intake flow from the turbocharger compressor.

BRIEF DESCRIPTION OF THE DRAWINGS

Other objects and advantages of the invention will become more apparent upon perusal of the detailed description thereof and upon inspection of the drawings in which:

FIG. 2 is a perspective view of a section of the EGR exhaust inlet of the system of FIG. 1, the arrows indicating the direction of flow;

FIG. 3 is a perspective view of an alternate embodiment of the EGR exhaust inlet of FIG. 2, the arrows indicating the direction of flow; and FIG. 4 is a perspective view of a section of the EGR exhaust outlet to the intake tract of the system of FIG. 1, the arrows indicating the direction of flow.

DESCRIPTION OF THE PREFERRED EMBODIMENT

Figure 1:
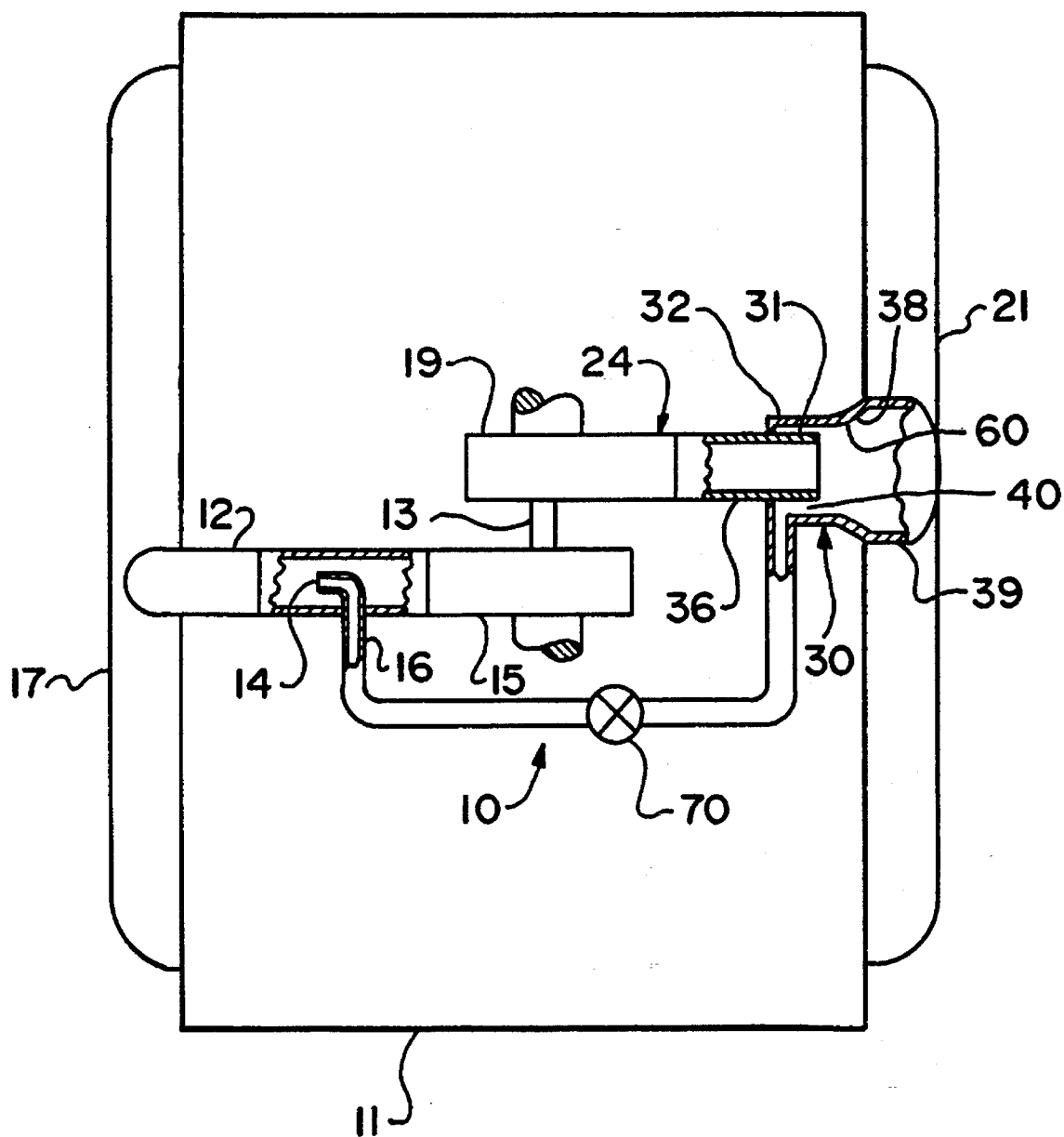
FIG. 1 is a diagrammatic view of the EGR system of the present invention as used on an internal combustion engine.

Referring now to the drawings in greater detail, there is illustrated diagrammatically in FIG. 1 an exhaust gas recirculation system made in accordance with the teachings of the present invention and generally identified by the reference numeral 10 which is mounted on an internal combustion engine 11 having a turbocharger 13 including an exhaust turbine portion 15 fluidly connected by exhaust tract 12 to an exhaust manifold 17 of engine 11. The turbocharger 13 further includes a compressor section 19 which is connected by an inlet tract 24 to an engine intake manifold 21.

The EGR system 10 generally connects the exhaust tract 12 to the engine inlet tract 24, the flow therethrough being controlled by an EGR valve 70 which is operated by conventional control logic and is otherwise conventional except for the three improvements discussed hereinbelow.

A first improvement at the entrance end of the EGR system utilizes the dynamic pressure available from the exhaust moving through the exhaust tract 12 to the turbocharger turbine 15. In this respect, as shown in FIGS. 1 and 2, an exhaust gas recirculation inlet 14 is provided in a simple impact tube 16 in the exhaust tract 12, with the inlet 14 of the tube 16 facing upstream, the tube 16 having its axis parallel to the axis of the exhaust tract 12 in the region adjacent the inlet 14, and being positioned centrally in the exhaust tract 12 at a point of high flow velocity.

Alternatively, as shown in FIG. 3, a more sophisticated inlet 18 to the EGR system 10 could be created in a curved exhaust tract 20 having a NACA submerged intake wall duct 22 disposed in the wall of the exhaust tract 20 on the outside of the curve at a point of high dynamic pressure.

With either of the above alternatives, the EGR system 10 would be converted from one which relies solely on static pressure differential to one which effectively utilizes the dynamic pressure of the exhaust flow as well as the static pressure differential.

A second improvement to the EGR system 10 is the creation of a low pressure area at 31 in the air inlet tract 24 into which exhaust gas to be recirculated is fed. Such area of low pressure is created in the preferred embodiment of the system 10 shown, by provision of an EGR discharge structure 30, which is shown in FIGS. 1 and 4 to comprise a tubular housing 32 disposed concentrically about a tube 36 having a predetermined diameter. The space between the housing 32 and the tube 36 is closed at the upstream end as at 34, while the tube 36 extends into the housing 32 to an end 50 upstream of a point where the housing 32 diverges with a smooth arcuate wall 38 to an outlet end 39 connected to the intake manifold 21. Thus, a hollow annular recess 40 having a closed end 34 is formed in the area between the tube 36 and the housing 32.

At the end 50 where the tube 36 terminates within the housing 32, the flow area is radially outwardly stepped at 31, causing a decompressive effect on air flow, and producing the desired area of low pressure just downstream of the end 50 of the tube 36, such low pressure area at 22 always ensuring an appropriate direction of exhaust gas flow when considered in combination with the high dynamic pressure at the exhaust inlet 14 of the EGR system 10. The third improvement to the EGR system 10 is the use of an arcuately diverging section in the housing 32 downstream of the stepped area 31 which applies the Coanda principle to use the EGR gas flow to induce intake flow from the turbocharger compressor.

As shown in FIG. 1, just downstream of the stepped area at 31 of the housing 32, the tract wall 60 flares radially outwardly in a gently diverging curve at 38. The flow of recirculated exhaust gas exiting from the annular recess 40 tends to follow the profile of the curved diverging wall 60, thereby inducing a lower pressure in the mainstream of the intake air flowing through the intake tract 24, causing a slight increase in air outflow from the turbocharger compressor 19 and offsetting some of the energy loss experienced by the turbine 15 of the turbocharger due to diversion of exhaust gas for recirculation.

As discussed above, the improved EGR system provides a number of advantages, some of which are inherent and others of which have been described above. Also, it will be apparent to those of ordinary skill in the art that various modifications and additions could be made to the system without departing from the nature of the invention. Accordingly, the scope of the invention should only to be limited as necessitated by the accompanying claims.

What is claimed is:

1. In an internal combustion engine having an intake tract having a direction of intake air flow, an exhaust tract having a direction of exhaust gas flow, and an exhaust gas recirculation system for recirculating a portion of the exhaust gas from said exhaust tract to said intake tract, said exhaust gas recirculation system comprising a tubular passage having an axis and having an EGR inlet fluidly connected to said engine exhaust tract, the improvement comprising said EGR inlet opening upstream in said exhaust tract, the axis of said tubular passage at said EGR inlet being parallel to the direction of flow therethrough, said exhaust tract having a wall and said EGR inlet being a NACA submerged intake duct disposed in the wall of the exhaust tract.

2. In an internal combustion engine having an intake tract having a direction of intake air flow, an exhaust tract having a direction of exhaust gas flow, a turbocharger having an exhaust turbine inlet connected to said exhaust tract and a compressor outlet connected to said intake tract, and an exhaust gas recirculation system for shunting a portion of the exhaust gas to the intake tract, the exhaust gas recirculation system including an EGR inlet means disposed in a high dynamic pressure region in said exhaust tract and aligned with said exhaust gas flow to receive said high dynamic pressure flow, a valve for controlling the flow, and an EGR outlet unobstructedly opening to said intake tract downstream of said compressor outlet, said intake tract having a portion wherein the flow area of said intake tract abruptly expands to create a low pressure region therein, said EGR outlet opening into said low pressure region, and a diverging peripheral wall in said intake tract downstream of said EGR outlet.

3. An intake tract device for use in introducing recirculated exhaust gas flow in an internal combustion engine having a turbocharger having a compressor outlet connected into the intake tract, comprising:

a housing having a cylindrical inlet end portion and a cylindrical outlet end portion, said housing outlet end portion being of a larger circumference than said housing inlet end portion, said housing having a smooth interior wall; and an inlet tube adapted for connection to said compressor outlet extending through an aperture in said housing into the inlet end portion, said tube terminating within said housing at an end, said tube being of smaller diameter than said inlet end portion of said housing to define an unobstructed annular space of uniform radial extent therebetween, said annular space being closed at said housing aperture;

said housing further including an inlet for exhaust gas to enter said annular space at a location upstream of the end of said inlet tube.

4. The device in accordance with claim 3 and said exhaust end portion of said housing further including a radially diverging wall surface extending from said end of said inlet tube to an exit from said exhaust end portion, said radially diverging wall surface having an arcuate shape in an axial direction of said housing, the curvature of said arcuately diversing wall being configured so that said exhaust gas flow follows the profile of said diverging wall within said intake tract.

5. In an internal combustion engine having an intake tract having a direction of intake air flow, an exhaust tract having a direction of exhaust gas flow, a turbocharger having an exhaust turbine inlet connected to said exhaust tract and a compressor outlet connected to said intake tract, and an exhaust gas recirculation system for recirculating a portion of the exhaust gas from said exhaust tract to said intake tract, said exhaust gas recirculation system having an EGR outlet opening to said intake tract, the improvement wherein an inner periphery of said intake tract adjacently downstream of said EGR outlet is radially outwardly stepped to define a larger unobstructed flow area in said intake tract than a flow area of said compressor outlet.

6. The invention in accordance with claim 5 wherein said EGR outlet comprises a closed housing disposed about the outer periphery of said intake tract upstream and and defining an unobstructed opening into said radially outwardly stepped portion of said intake tract.

7. The invention in accordance with claim 6 wherein said inner periphery of said housing further comprises an arcuately diverging wall downstream of said EGR outlet to said intake tract, the curvature of said arcuately diverging wall being configured so that said exhaust gas flow follows the profile of said diverging wall within said intake tract.

8. In an internal combustion engine having an unobstructed intake tract having a direction of intake air flow, an exhaust tract having a direction of exhaust gas flow, a turbocharger having an exhaust turbine inlet connected to said exhaust tract and a compressor outlet connected to said intake tract, and an exhaust gas recirculation system for recirculating a portion of the exhaust gas from said exhaust manifold to said intake tract, said exhaust gas recirculation system having an unobstructed EGR outlet opening to said intake tract downstream of said compressor outlet, the improvement comprising said intake tract having an area defined by an arcuately diverging peripheral wall downstream of said EGR outlet, the curvature of said arcuately diverging wall being configured so that said exhaust gas flow follows the profile of said diverging wall within said intake tract.

9. The system of claim 8 wherein said diverging wall is formed in a housing defining a downstream portion of said intake tract, said intake tract having a radially outwardly stepped inner peripheral wall disposed at said EGR outlet.

* * * * *